Oct. 26, 1948.  L. E. WOOD  2,452,090
CODING APPARATUS

Filed Dec. 29, 1944  4 Sheets-Sheet 1

INVENTOR
*LOUVAN E. WOOD*
BY
*Roy D Bateman*
ATTORNEY

Oct. 26, 1948.  L. E. WOOD  2,452,090
CODING APPARATUS
Filed Dec. 29, 1944  4 Sheets-Sheet 2

INVENTOR
LOUVAN E. WOOD
BY
Roy D Bateman
ATTORNEY

INVENTOR
LOUVAN E. WOOD
BY Roy D Bateman
ATTORNEY

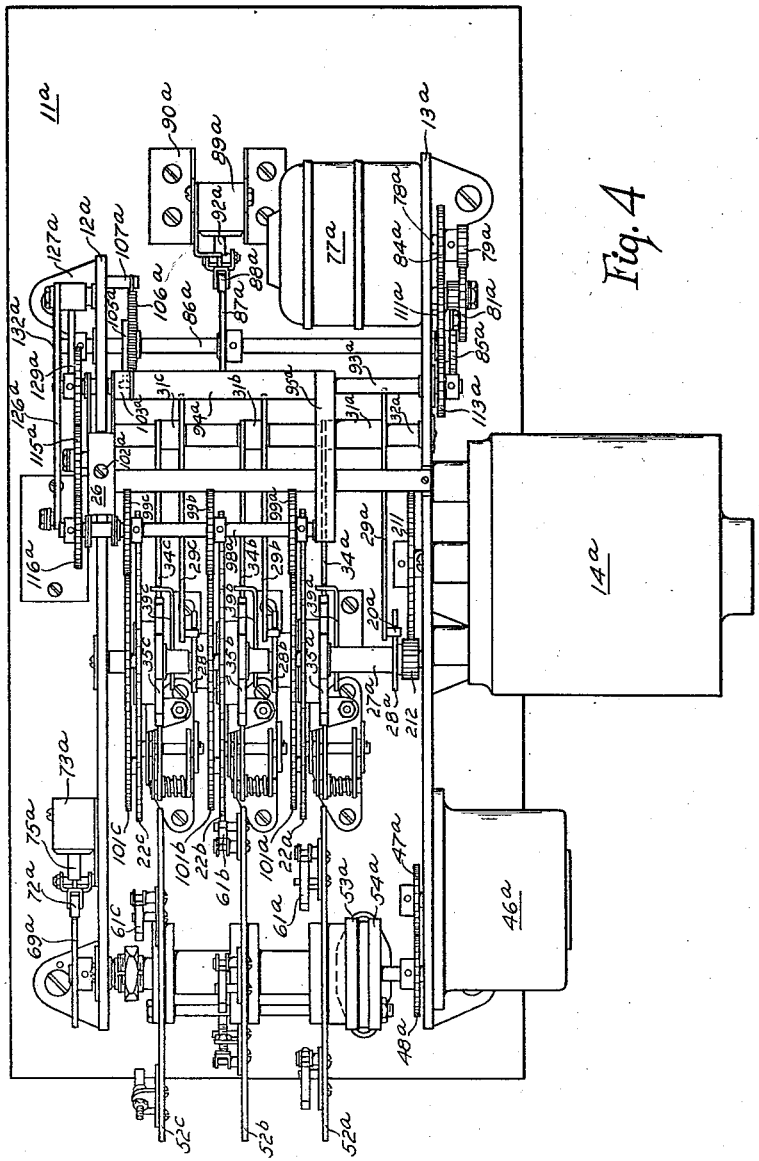

Patented Oct. 26, 1948

2,452,090

UNITED STATES PATENT OFFICE 2,452,090

CODING APPARATUS

Louvan E. Wood, Baltimore, Md., assignor to Bendix Aviation Corporation, South Bend, Ind., a corporation of Delaware Application December 29, 1944, Serial No. 570,402

12 Claims. (Cl. 177—351)

The present invention relates to measuring apparatus and more particularly to apparatus of the character embodying means for converting the measurements into indications which may be transmitted to a distance.

Although apparatus of this general character have been previously proposed, they have not been altogether satisfactory for the reason that frictional and other forces have been set up which have introduced substantial error into the indication.

I have discovered that by associating with the movable measuring member a motor driven sweep or scanning element, and providing switch means which will be closed when the parts are moved into angular coincidence, and gripping the measuring member momentarily at the time of switching, and providing a coding mechanism, embodying a circuit controlled by the scanning switch, the magnitude of the measurement being made may be accurately converted into an indication which may be readily transmitted to a distance by telegraph or radio.

It is accordingly the primary object of the present invention to provide a novel measurement transmitting apparatus in which the act of converting the measurement into a transmittible indication does not exert any frictional or torquing forces which would exert rotative error deflecting the measuring from its true position and which is of simple, efficient, rugged, and yet low cost design.

Another important object is to provide a measurement or condition transmitting apparatus embodying coding wheels which are automatically rotated for a period proportional to the measurement being made, the wheels embodying Morse or other code representations on their peripheries and being combined in novel manner with a sweeping contact assembly designed to transform the measurement into a series of electrical impulses.

Another object is to provide a measuring apparatus embodying novel measurement scanning and measurement coding mechanisms controlled to operate in proper sequence by a timing mechanism, to take an indication from a condition or measuring instrument having a member movable in accordance with the measurement or condition, and convert it into a form of indication which is transmittible to a distance.

The invention also aims to provide a measuring apparatus embodying novel actuating, resetting, scanning, and indication transmitting mechanisms.

Further objects will become apparent as the specification proceeds in conjunction with the annexed drawings, and from the appended claims.

In the drawings:

Figure 4 is a top plan view, similar to Figure 2, but shows a modified coding mechanism also forming part of the invention.

Figure 1:
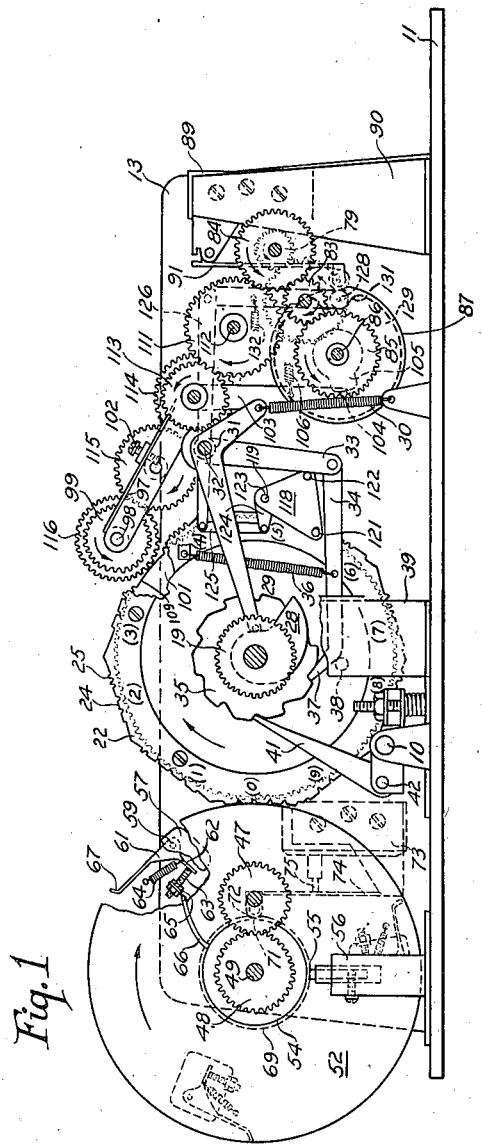
Figure 1 is a side elevational view, with one of the side plates removed, of a coding mechanism embodying the invention.
Figure 2:
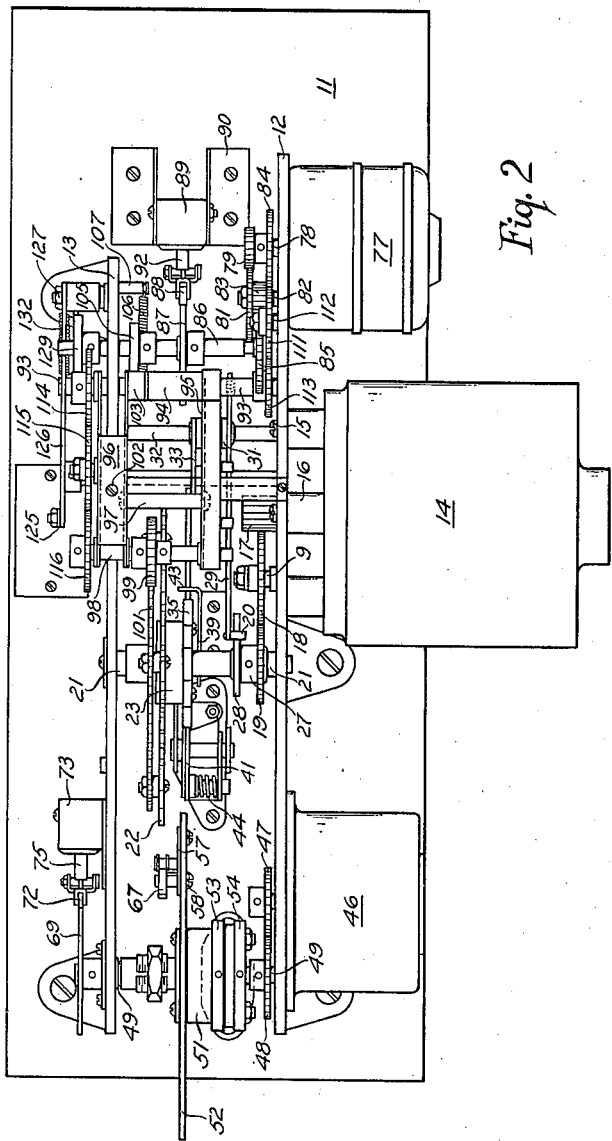
Figure 2 is a top plan view of the apparatus shown in Figure 1.

With continued reference to the drawings, in which like reference characters have been employed to designate similar parts throughout the several views, and referring first to Figures 1 and 2, the coding mechanism is mounted upon a suitable base 11 having a pair of upstanding side plates 12 and 13 secured thereto. As seen in Figure 2, a main driving motor 14 is secured to side plate 12 by means of a plurality of screws 15 and spacers 16. The shaft of motor 14 carries a drive pinion 17 which meshes with an idler gear 18, journaled on a post 9 carried by plate 12. Gear 18 meshes with a gear 19 which is journaled on shaft 21 which is anchored at its ends in the side plates.

A coding disc 22 has a hub 23 journaled upon shaft 21. Disc 22 is provided with 10 groups of Morse code defining projections upon which the measurement to be transmitted is set up. As seen in Figure 1, each group comprises long projections 24 and short projections 25. The combination of projections of any one group is different from that of any other group. In the present instance they run from zero in a clockwise direction to 9, as indicated. The coding wheel is driven in a clockwise direction (Figure 1) by motor 14, in the manner which will now be described.

Gear 19 has a hub 27 which rigidly carries a cam 28. The latter cooperates with a pin 20 carried by the end of a bell-crank lever 29, which is rigidly carried by a hub member 31 journaled on a shaft 32, and which is anchored in the side plates. Also secured to hub 31 is a lever 33, which is pivotally connected at its lower end to a pawl 34. The latter cooperates with the teeth of a ratchet wheel 35 which is rigidly secured to hub 23, for unitary rotation with the coding wheel.

Pawl 34 is urged into engagement with its ratchet by means of a spring 36, and is provided with an inclined end face 37 which rides against a pin 38 carried by bracket 39 on the base, for the purpose of preventing the code wheel from being advanced by more than one ratchet tooth for each actuation of the pawl, in the manner to be hereinafter pointed out.

Reverse rotation of the ratchet wheel and coding disc assembly is prevented by means of a pawl 41 pivoted at 42 on a bracket assembly 10 and having its end urged into engagement with the ratchet wheel teeth by means of a coiled spring 42. Bracket 39 is also provided with a slotted portion 43 for guiding pawl 34.

From the structure so far described, it is apparent that motor 14, through gears 17, 18 and 19 will rotate cam 28, and that for each rotation of the cam, levers 29 and 33 will undergo a complete reciprocation causing pawl 34 to first be moved to the right and engaged in the next tooth of ratchet wheel 35, and to then be reciprocated to the left to advance the coding wheel one step. Since inclined face 37 of the pawl is engaged with pin 38 at the end of the stroke of the pawl, the device is self-locking and there is no possibility of rotational momentum carrying the coding wheel through two or more steps. As will be hereinafter pointed out, the coding wheel is rotated rearwardly with respect to the code representations. Therefore, the longer the period of rotation of motor 14 the lower the reading will be.

When the coding wheel has been brought into coding position, i. e., motor 14 has completed its period of rotation, the selected group of Morse code projections is swept over by a switch assembly for converting the reading into an indication which may be transmitted to a distance. This mechanism will now be described.

Secured to side plate 12 is a coding motor 46, carrying a gear 47 which meshes with a gear 48 rigidly secured to a shaft 49 journaled in the side frames. Rigidly secured to shaft 49 is a hub member 51 to which is secured a disc 52 and a pair of slip rings 53 and 54. The latter cooperate with a pair of brushes 55 carried by a brush holder 56 mounted on base 11. Disc 52 carries a plurality of switches, and since they are of identical construction only one of them will be described in detail. Each switch assembly comprises a plate 57 secured to the disc by screws 58 and having a pivot member 59 upon which a switch member 61 is pivoted. Each switch member has a contact portion 62 which is urged into engagement with a contact screw 63 by means of a tension spring 64. Screw 63 is insulatingly mounted on a support 65 carried by plate 57, and is connected to one of the slip rings by a lead 66. The other slip ring is connected to each of the plates 57, so that when the parts are in the position shown in Figure 1, a circuit is completed between the slip rings by screw 63 and member 62.

As seen in Figure 2, the parts are so dimensioned that a finger 67 provided on each switch is adapted to rotate in the plane of rotation of the coding wheel, and to sweep over the Morse code representations thereof, it being observed that each time finger 67 rides over a projection it will open the circuit between the slip rings for a period of time depending upon the circumferential length of the projection. For instance, in the position of the parts illustrated in Figure 1, if disc 52 were rotated clockwise, as indicated, each finger would open its switch for five "long" periods, by reason of the fact that the zero group of representations are disposed in coding position.

Accordingly, for each revolution of disc 52, the fingers 67 of each switch will sweep over in contacting engagement with the particular group of projections which happen to be disposed adjacent the disc, which may be termed the coding zone, and the resulting signal will, therefore, be given three times, the switches being connected to the slip rings in series so that opening any one of them will open the slip ring circuit.

The resulting signal, in the form of current interruptions, may be transmitted to a distance in any well known manner, as for instance over a wire or telegraphically, or it may be introduced into the transmitter of a radio and broadcast in well known manner.

In order to lock motor 46 across the line upon initiation of the coding operation, a disc 69 is rigidly secured to shaft 49 and is provided with a notch 71 in which the roller 72 of a switch 73 is adapted to seat in the position of the parts shown in Figures 1 and 2. Roller 72 is carried by an arm 74, pivoted on the switch body, in cooperating relationship with the switch actuating pin 75. The parts are so designed that when roller 72 is seated in the notch in the disc, the switch is open, and when it rides out of the notch the switch is closed. The manner in which the switch is associated with the circuit will be hereinafter set forth.

After motor 14 has rotated the coding wheel into the transmitting position and is stopped, and motor 46 has caused the switches to sweep over the selected group of Morse code projections, the device is automatically "reset" or restored to zero or starting position by the mechanism which will now be described.

Secured to side plate 12 is a resetting motor 77 having a shaft 78 rigidly carrying a pinion 79. The latter meshes with a gear 81 journaled on a pin 82, carried by side plates 12, and rigidly carrying a pinion 83 which meshes with a gear 85 rigidly secured to a shaft 86 journaled in the side frames. Shaft 86 causes a resetting train of gearing to be meshed with gears on the code wheel, and the resetting gear train is energized by gear 84 in the manner that will now be set forth.

Shaft 86 carries a notched disc 87 which cooperates with the roller 88 of a switch 89, the roller being mounted on an arm 91 and coacting with a switch actuating pin 92. This forms a holding circuit for the resetting motor in the manner that will be described later.

Journaled on a shaft 93, which in turn is journaled in the upper portions of the side frames, is a swinging frame assembly made up of a hub portion 94 and a pair of side arms 95 and 96, which are rigidly interconnected by a post 97. A shaft 98 is journaled in the ends of the side arms 95 and 96 and rigidly carries a spur gear 99, which is adapted to be meshed with a spur gear 101 secured by screw and spacer assemblies to the coding wheel. The parts are adapted to be brought in to mesh when the frame is swung downwardly, such downward movement being limited by a set screw 102, which coacts with the upper edge of side plate 13. The frame is lifted or swung away from operative position by means of an arm 103 having a hub rigidly carried by the frame and having a pin 104 at its lower end disposed in the path of rotation of a cam 105 secured to shaft 86. The frame is urged downwardly by means of a tension spring 106 secured to lever 103, and anchored to a pin 107 carried by side plate 13.

Accordingly, when cam 105 is disposed in the position illustrated in Figure 1, the swinging frame will be held in the elevated position illustrated against the action of spring 106, and when shaft 86 is rotated so as to allow pin 104 to ride off of the raised portion of the cam, gear 99 will be brought in to mesh with code wheel gear 101. It should be observed that in the position of the parts illustrated, drive pinion 99 is disposed opposite blank or "mutilated" portion 109 of gear 101 where there are no teeth, with the result that if the resetting operation should be initiated with the parts so disposed, no rotation of the code wheel would occur.

The resetting spur pinion 99 is driven in the following manner. Gear 84 rigidly secured on motor shaft 78 meshes with an idler 111 carried by support 112 on the side plate, and it in turn meshes with a gear 113 which is rigidly secured to shaft 93. Secured to the latter, outwardly of side plate 13, is a gear 114 meshing with an idler 115 carried by a post on frame member 96, and in turn meshing with a gear 116 rigidly secured to shaft 98. From the foregoing it is apparent that rotation of motor 77 in a counter-clockwise direction (Figure 1), will, through the two gear trains, rotate shafts 86 and 98 in similar directions. Counterclockwise rotation of gear 99, when the latter is meshed with the teeth of gear 101, rotates the coding wheel clockwise. In order to prevent pawl 34 from interfering with clockwise rotation of the coding wheel during resetting it is retracted as follows. A plate 118 is pivoted at 119 and carries pins 121 and 122 cooperating respectively with pawl 34 and lever 33, so that in response to counter-clockwise rocking of plate 118 lever 33 will be pulled back and pawl 34 will be depressed so as to clear the teeth of ratchet 35. Plate 118 is rigidly secured to a shaft 123 which extends outwardly of side frame 13 and carries a lever 124 (shown in solid lines in Figure 1 for sake of clarity). The latter is connected by link 125 to a bell crank lever 126, pivoted on a post 127 and having a pin 128 on its lower end coacting with a disc 129 having a recess 131. In the position of parts shown in Figures 1 and 2, pin 128 is disposed in recess 131. Spring 132 normally maintains the parts in this position, and it is connected to lever 126 and is anchored in a suitable part of the frame.

From the foregoing it is apparent that when shaft 86 is rotated counter-clockwise from the position illustrated in Figure 1, cam 129 will rock lever 126 counter-clockwise, and through link 125 will rock plate 118 in a similar direction, causing pin 122 to move lever 33 to the right and causing pin 121 to depress pawl 34 against the action of spring 36. The projection on cam 105 will ride out from under pin 104, thereby allowing spring 106 to depress the frame and bring spur gear 99 into mesh with gear 101, which is now free to turn and which will be rotated clockwise until blank portion 109 of gear 101 is brought opposite spur pinion 99, whereupon the coding wheel will have attained its starting position.

Figure 3:
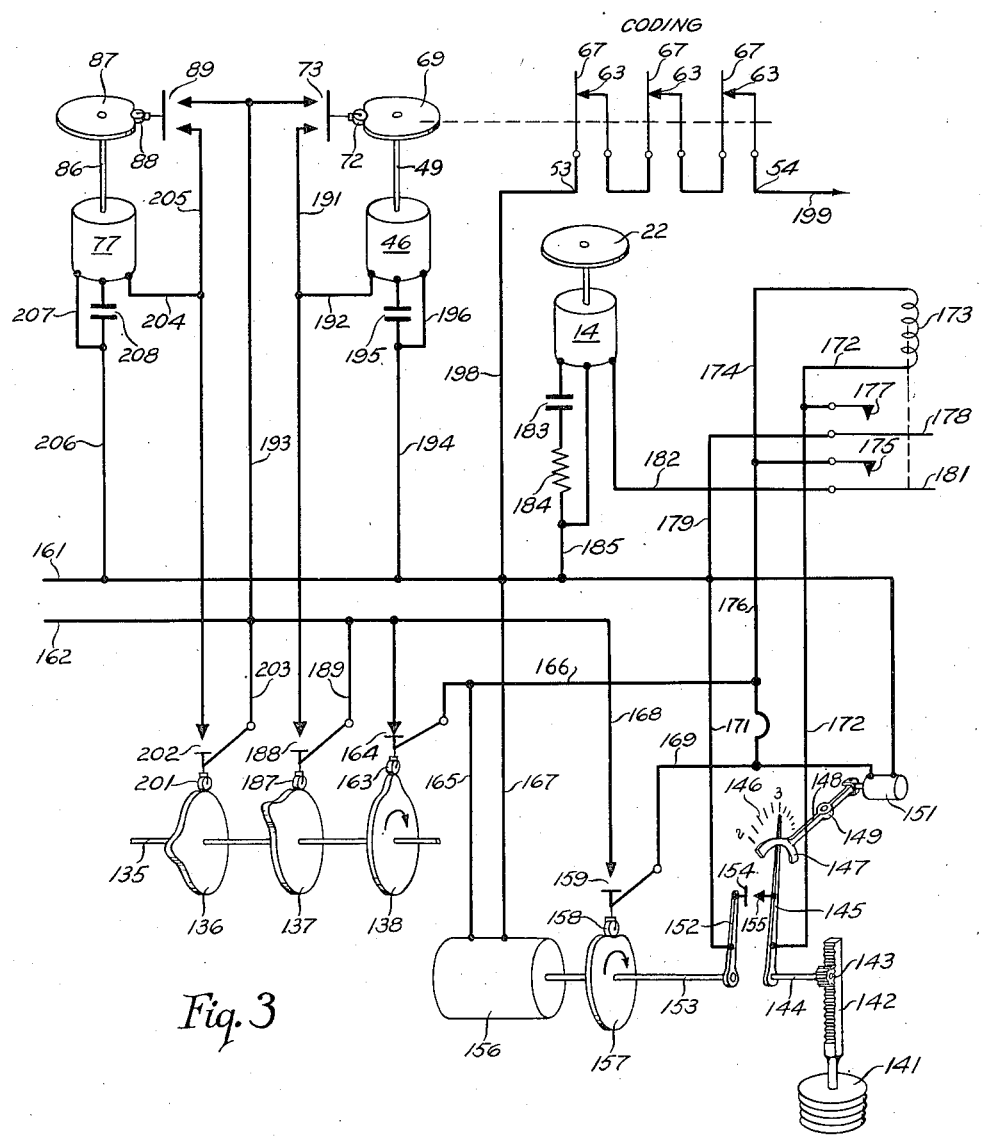
Figure 3 is a schematic view showing the circuit for the electrical components of Figures 1 and 2, and also disclosing the time-controlled means for controlling the various circuits, and also the scanning device.

Referring now to Figure 3, which shows the novel scanning mechcanism of the invention and also the circuit for controlling the electrical components of the device shown in Figures 1 and 2, a shaft 135 is driven at constant speed in any suitable manner, as for instance by a clock or a constant speed motor, and carries cams 136, 137 and 138. The cams are angularly spaced to initiate the various operations at the appropriate times, in the manner that will now be set forth.

The measuring instrument or condition indicating device may be of any desired character, so long as it embodies a member which is movable in response to the measurement or the indication. In the present instance the invention has been illustrated as applied to a pressure instrument embodying a bellows 141 which may be expanded or contracted in response to fluid pressures, and it is provided with a reciprocable rack 142 meshing with a pinion 143 carried by shaft 144. In expanding and contracting, the bellows accordingly produces rocking movement of shaft 144, and the latter carries a pointer 145 for indicating the pressure. The pointer cooperates with a scale 146 (diagrammatically illustrated), and also cooperating therewith is a clamping member 147 carried by an arm 148 pivoted at 149 and actuated by a solenoid 151. The solenoid clamps the pointer momentarily during the period the pressure is being scanned, and prevents the switch contacts from affecting the position of the pointer. As will be readily understood, clamping member 147 (only a portion of which has been shown), extends over the entire range of movement of pointer 145, so as to grip the latter in any rocked position.

Scanning is carried out by means of an arm 152 carried by a shaft 153 and having a switch element 154 cooperating with a switch element 155 on pointer 145. Shaft 153 is rotated by a motor 156 at reduced speed through a speed reducing mechanism (not shown). Shaft 153 also carries a notched disc 157 which cooperates with the roller 158 of a switch 159. Power is supplied by lines 161 and 162, and the device is placed in operation by cam 138 lifting roller 163 of a switch 164, as seen in Figure 3. The switch has one side connected to line 162 and the other side is connected by means of leads 165 and 166 to motor 156 and solenoid 151 respectively. One side of motor 156 is permanently connected to the line by a lead 167.

It is accordingly apparent that with the parts in the positions illustrated, and with switch 164 closed, motor 156 will start and the latter will rotate disc 157, thereby lifting roller 158 out of its notch and closing switch 159. Closure of switch 159, through a lead 168, places motor 156 across the line independently of lead 165, and also, through a lead 169, completes the circuit of solenoid 151, causing it to energize ring 147 and clamp the pointer. With the parts in the positions just described, pointer 145 is clamped and arm 152 is being rotated in the direction indicated by shaft 153. It should be observed that arm 152 has been illustrated as being angularly displaced (clockwise) from its true position with respect to disc 157, in order to show the coaction betwen contacts 154 and 155. Upon rotation of shaft 153 through a predetermined distance, depending upon the position into which pointer 145 has been actuated by bellows 141 (scale indication "3" in Figure 3), switch part 154 of the arm will engage switch part 155 of the pointer, thereby closing a circuit through a lead 171 to line 161, and through a lead 172 to one side of a solenoid 173. The other side of the solenoid is connected by a lead 174 to a contact 175, and by a lead 176 to lead 166.

A second contact 177 is connected to lead 172, the parts being so arranged that upon energization of the solenoid in response to arm 152 attaining an angular position coinciding with the pointer, its contact arm 178 will be energized by the solenoid and engage contact 177 and maintain the solenoid energized subsequent to disengagement of contact parts 154 and 155, by means of a lead 179 which connects contact arm 178 directly to line 161. A second contact arm 181 actuated by the solenoid engages contact 175 and starts the coding operation by means of a lead 182 connected to motor 14, the latter being connected to the other side of the line by means of a condenser 183, a resistor 184, and a lead 185.

From the foregoing disclosure it is to be observed that upon starting motor 156 in the manner just described, the pointer will be clamped, and contacts 154 and 155 will momentarily engage and energize relay or solenoid 173, which in turn holds itself across the line by means of contact arm 178, and a second contact arm 181 starts the coding wheel motor. It is also apparent that the coding motor will continue to run until disc 157 has rotated sufficiently for roller 158 to again drop into the notch. When this occurs, switch 159 opens, causing solenoid 151 to be de-energized, thereby releasing clamp 147, and also de-energizing relay 173, which in turn opens contact arms 178 and 181 and stopping motor 14. By means of the foregoing structure motor 14 is energized for a period depending upon the time contact 154 of the rotating arm first engages contact 155 of the pointer, and it continues to run for the balance of rotation of arm 152.

Assuming that scale 146 of the instrument is graduated from 1 to 10, and that the pointer is standing at numeral 3 as indicated, the contact will be closed when arm 152 moves into an angular position coinciding therewith, and motor 14 will start at that instant and will run for the entire balance of rotation of the arm, namely, approximately ¾ of a revolution. While the foregoing operation is taking place, motor 14 rotates coding wheel 22 clockwise, it being remembered that the code representations are so arranged that step-by-step operation causes the values to progressively decrease. Therefore, the foregoing operation will bring the 7th group of Morse code projections representing numeral "3" into cooperation with switches 67. In other words, if pointer 145 is at its minimum indication (1, in the illustrated embodiment), the code unit will commence counting at the beginning of the scanning period, with the result that the final number will be low. Conversely, if pointer 145 is at its maximum indication, the code unit will not start to be advanced step-by-step (or counted down), until the very end of the scanning operation, with the result that the final number will be high.

Upon completion of the operation just described, all the parts are de-energized except shaft 135, which has in the meantime moved the projection of cam 138 beyond roller 163. The projection on cam 137 now engages the roller 187 of a switch 188, which is connected at one side to line 162 by lead 189, and at the other side, by means of leads 191 and 192, to switch 73 and motor 46 respectively. Switch 73 is connected to line 162 by a lead 193, and motor 46 is connected to line 161 by means of a lead 194; a condenser 195; and a second lead 196.

When switch 188 is closed in the manner just described, motor 46 is placed across the line by leads 192 and 194, and switch 73 is so connected that when disc 69 lifts roller 72 out of its notch, switch 73, through line 193, will place the motor across the line independently of switch 188. Motor 46, which operates the scanning mechanism, will therefore run for a sufficient length of time to rotate shaft 49 a full revolution, and cause each of the switch fingers 67 to ride over the projections of the code wheel which are located in the coding station. The slip rings 53 and 54 of the coding switches are connected by leads 198 and 199 to line 161 and to the telegraphic, radio or other signal transmitting device. Upon conclusion of the operation just described, roller 72 seats itself in the notch of disc 69, thereby opening switch 73 and stopping motor 46, inasmuch as the projection of cam 137 has now rotated beyond roller 187. This completes the coding operation.

The projection of cam 136 now lifts roller 201 of a switch 202, which is connected at one side to line 162 by means of a lead 203, and at the other side by means of leads 204 and 205, to reset motor 77 and switch 89 respectively. Switch 89 is also connected to lead 193. The other side of motor 77 is connected to line 161 by means of leads 206 and 207 and a condenser 208. Upon rotation of disc 87, in response to operation of motor 77, roller 88 is lifted out of its notch and closes switch 89, thereby connecting motor 77 across the line by way of leads 193 and 206, independently of switch 202. The resetting operation is then carried out by motor 77 and its gear trains, in the manner previously set forth, and upon conclusion thereof roller 88 again seats in its notch 87, opening switch 89 and stopping motor 77, inasmuch as the projection of cam 136 has in the meantime opened switch 202. The device has now completed a full cycle of operation, and upon further rotation of shaft 135 the sequence of operations which have just been described, will be automatically repeated.

The embodiment of the invention just described deals with the transmission of measurements which involve a single digit. If it is desired to transmit information involving two or more digits, this may be readily carried out by adding the necessary number of code wheels and coding switches to the mechanism.

In the modification of the invention illustrated in Figure 4 there is disclosed an embodiment of the apparatus designed for the transmission of information involving three digits, and inasmuch as many of the parts are similar to those of the form of the invention just described, the same reference characters, with the subscript *a*, will be employed to designate corresponding parts.

Motor 14a is energized in the same manner as before and carries a gear 211 meshing with a pinion 212 journaled on shaft 21a and rigidly connected to cam 28a. Cam 28a actuates lever 29a and pawl 34a in the manner previously described, thereby advancing ratchet wheel 35a and its coding wheel 22a in the manner previously set forth. In this instance, the hub of coding wheel 22a also carries a cam 28b, similar to cam 28a, which in turn actuates a lever 29b. The latter, through a pawl 34b, rotates a ratchet wheel 35b and a rigidly connected second code wheel 22b.

From the foregoing it is apparent that for each rotation of cam 28a, in response to rotation of pinion 212, coding wheel 22a will be advanced one step, and that for every complete revolution of coding wheel 22a, coding wheel 22b will be advanced one step (one tenth of a revolution). In similar manner, a cam 28c carried by coding wheel 22b, will rock lever 29c and actuate pawl 34c in such manner as to advance ratchet wheel 35c, which is rigidly connected to a third coding wheel 22c. From the foregoing it is apparent that any desired number up to 999 may be set up on the code wheels.

In this instance the coding switch assembly is made up of three discs 52a, 52b, and 52c, each of which carries three switches, and the latter are disposed in staggered relationship so that a switch of disc 52a will first sweep over the projections of coding wheel 22a, followed by similar sweeping operation by a switch of disc 52b, and then by a switch of disc 52c, so as to make proper sequence in the transmitting circuit, it being understood that each disc may carry three switches as before, spaced 120° apart with respect to each other. Three successive transmissions of each digit set up on the coding wheels will accordingly be made.

The resetting mechanism is also similar to that previously set forth, except that in this instance motor 77a is disposed inwardly of frame member 13a to conserve space, and the reducing gear train is located outwardly thereof. Also, it is to be observed that frame members 95 and 96 are spread sufficiently to permit three reset spur gears 99a, 99b and 99c to be secured on shaft 98a. The resetting operation is the same as that previously set forth, except that in this case the three resetting spur pinions are simultaneously brought in to mesh with reset gears 101a, 101b, and 101c of the respective code wheels, and since none of the wheels need be rotated a full revolution to return it to starting position, the resetting operation is just as rapid as with the single wheel form. The pawls are retracted by a plurality of plates similar to plate 118 and actuated by bell-crank lever 126a, in the manner described in conjunction with the first form of the invention.

From the foregoing detailed disclosure of the invention it is apparent that novel apparatus are provided which will take an indication from a measuring or condition indicating device and, without setting up any force in such device which would introduce error into the readings, will transform or convert the reading into the form of electrical impulses or other form of signal which may be readily transmitted to a distance by telegraph, radio, or by other transmission media well known in the art.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced thereby.

What is claimed and desired to be secured by United States Letters Patent is:

1. In a signaling apparatus, a rotatable code wheel; power means, including ratchet means, for advancing said code wheel step-by-step; ratchet means for preventing retrograde rotation of said code wheel, the latter having a plurality of sets of code-defining projections around its periphery; a structure mounted for rotation adjacent said code wheel and carrying switch means having a finger adapted to ride over the set of projections of said code wheel located nearest said device; and time-controlled means for advancing said code wheel for a predetermined period; means for rotating said device after advance of said code wheel has ceased; and resetting means for returning said code wheel to a predetermined starting position subsequent to completion of rotation of said device.

2. The apparatus defined in claim 1, wherein said first-named ratchet means is also operable to prevent advance of said code wheel between steps, and said resetting means is operable to render said first-named ratchet means inoperative while said code wheel is being returned to starting position.

3. The apparatus defined in claim 1, wherein said projections lie along an arc, having a radius of curvature substantially equal to the path of rotation defined by the end of the switch finger.

4. In a measuring apparatus, in combination with a measuring instrument having a member movable in accordance with the magnitude of the measurement; means for gripping said member and holding it stationary independently of the magnitude of the measurement and having operative and inoperative positions; an element mounted for movement coextensive with the path of travel of said member; switch means adapted to be automatically closed when said member and element attain coincidental angular positions; power means for moving said element through its full range of travel; common means for energizing said power means and for moving said gripping means into operative position, whereby said member is held stationary during closure of said switch means; and coding means, including a circuit controlled by said switch means, for converting the measurement into an indication which may be transmitted to a distance.

5. The measuring apparatus defined in claim 14, wherein said power means includes means for automatically de-energizing said power means and moving said gripping means into inoperative position when said element has completed its full range of movement.

6. The measuring apparatus defined in claim 14, wherein said coding means comprises a rotatable wheel having a plurality of groups of code-defining projections on its periphery and a motor drivingly connected to said wheel and automatically controlled by said circuit for advancing said wheel through an angular distance proportional to the time of closure of said switch means, and means coacting with the selected group of projections of said wheel, for converting the position of said wheel into an indication which may be transmitted to a distance.

7. In a data transmission system, a condition responsive element, a coding member provided with a plurality of zone groups of differing characteristics, a setting motor controlled by said condition responsive element, a set drive linkage connecting said setting motor and said coding member, a reset motor, a reset drive linkage connecting said reset motor and said coding member adapted to interrupt the driving connection when said coding member occupies a predetermined reference position, and means for disabling said set drive linkage during the reset operation.

8. In a data transmission system, a condition responsive element, a set member, a setting motor controlled by said condition responsive element, a set drive linkage connecting said setting motor and said set member, a reset motor, a reset drive linkage connecting said reset motor and said set member adapted to interrupt the reset driving connection when said coding member occupies a predetermined reference position, and means actuated by said reset motor for disabling said set drive linkage.

9. In a data transmission system, a code member provided with a plurality of zone groups of differing characteristics, a set motor, an intermittent drive connection linking said set motor and said code member whereby different zone groups are successively indexed into position at a reading station, a reset driven surface linked with said code member provided with a depressed portion at a predetermined reference position, a reset driving surface normally disengaged from said reset driven surface movable into engagement with said reset driven surface, a motor powering said reset driving surface, means for disabling said intermittent drive connection and bringing said reset driving surface into engagement with said reset driven surface, and means for reading out the zone group characteristics at said reading station.

10. In a data transmission system, a code member provided with a plurality of zone groups of differing characteristics, a set motor, a set drive linkage connecting said set motor and said code member whereby different zone groups may be positioned at a reading station, means for reading out the zone group characteristics at said reading station, a toothed reset driven surface linked with said code member provided with an interruption in said teeth at a predetermined reference position, a toothed reset driving surface normally disengaged from said reset driven surface movable into engagement with said reset driven surface, means powering said reset driving surface, means for disabling said set drive linkage and bringing said reset driving teeth into engagement with said reset driven teeth, and a stop limiting the movement of said reset driving teeth toward said reset driven teeth.

11. In a data transmission system, a code member provided with a plurality of zone groups of differing characteristics, a set motor, a set driving linkage connecting said set motor and said code member whereby different zone groups may be positioned at a reading station, means for reading out the zone group characteristics at said reading station, a reset driven gear having a gap in the peripheral teeth thereof linked with said code member, a reset driving gear normally disengaged from said reset driven gear movable into engagement with said reset driven gear, a reset motor powering said reset driving gear, means actuated by said reset motor for disabling said set driving linkage and bringing said reset driving gear into engagement with said reset driven gear, and a stop limiting the movement of said reset driving gear toward said reset driven gear.

12. In a data transmission system, a rotatably mounted code wheel having a periphery provided with a plurality of zone groups of differing characteristics, a set motor, a set driving linkage connecting said set motor and said code wheel whereby different zone groups may be positioned at a reading station, means for reading out the zone group characteristics at said reading station, a driven rotatably mounted reset gear linked with said code wheel and having a gap in the peripheral teeth thereof, a reset arm pivoted for rotation about an axis parallel to the axis of rotation of said driven reset gear, a reset driving gear journaled on the free end of said reset arm movable into engagement with said reset driven gear upon rotation of said reset arm, a stop limiting the travel of said reset driving gear toward said reset driven gear, a reset motor powering said reset driving gear, and means actuated by said reset motor for displacing said reset arm and disabling said set driving linkage.

LOUVAN E. WOOD.

REFERENCES CITED

The following references are of record in the file of this patent:

UNITED STATES PATENTS

| Number | Name | Date |
|---|---|---|
| 313,147 | Wilson | Mar. 3, 1885 |
| 1,620,405 | Sprenger | Mar. 8, 1927 |
| 1,621,939 | Lowe | Mar. 22, 1925 |
| 1,785,940 | Ennes | Dec. 23, 1930 |
| 1,965,393 | Schleicher et al. | July 3, 1934 |
| 2,085,415 | Chauveau | June 29, 1937 |
| 2,099,982 | Koenig | Nov. 23, 1937 |
| 2,146,189 | Kiner | Feb. 7, 1939 |
| 2,148,075 | Kiner | Feb. 21, 1939 |
| 2,207,743 | Larson et al. | July 16, 1940 |
| 2,239,094 | Harvey | Apr. 22, 1941 |
| 2,279,232 | Graham | Apr. 7, 1942 |
| 2,290,753 | Keckley | July 21, 1942 |
| 2,309,117 | John | Jan. 26, 1943 |
| 2,329,370 | Hicks | Sept. 14, 1943 |

FOREIGN PATENTS

| Number | Country | Date |
|---|---|---|
| 23,234 | Australia | July 27, 1936 |